Oct. 18, 1927.
C. W. PLACE
1,646,215
AUTOMATIC SWITCHING EQUIPMENT
Filed Sept. 15, 1922
2 Sheets-Sheet 1
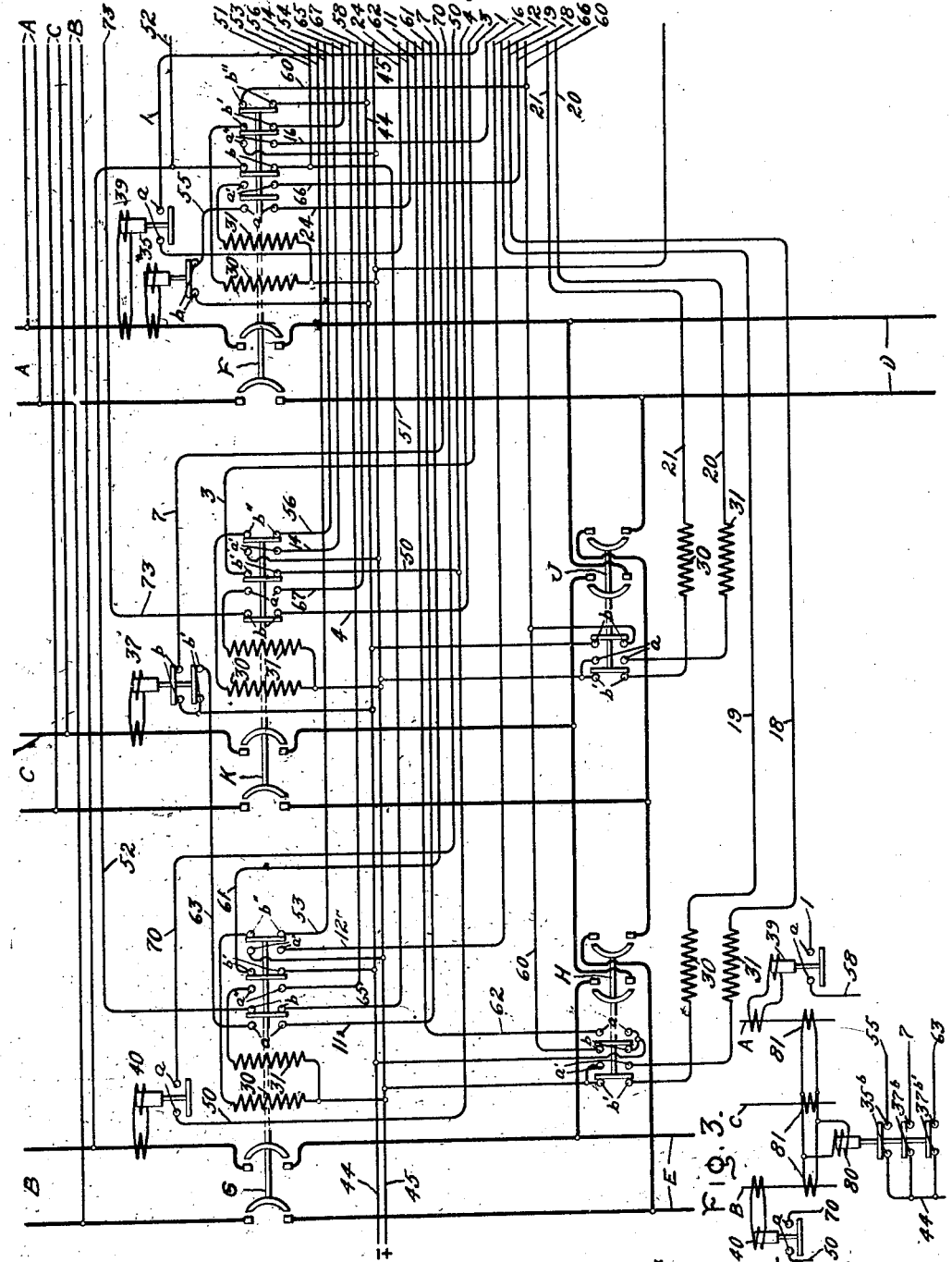
Inventor:
Claude W. Place,
by Albert G. Davis
His Attorney.

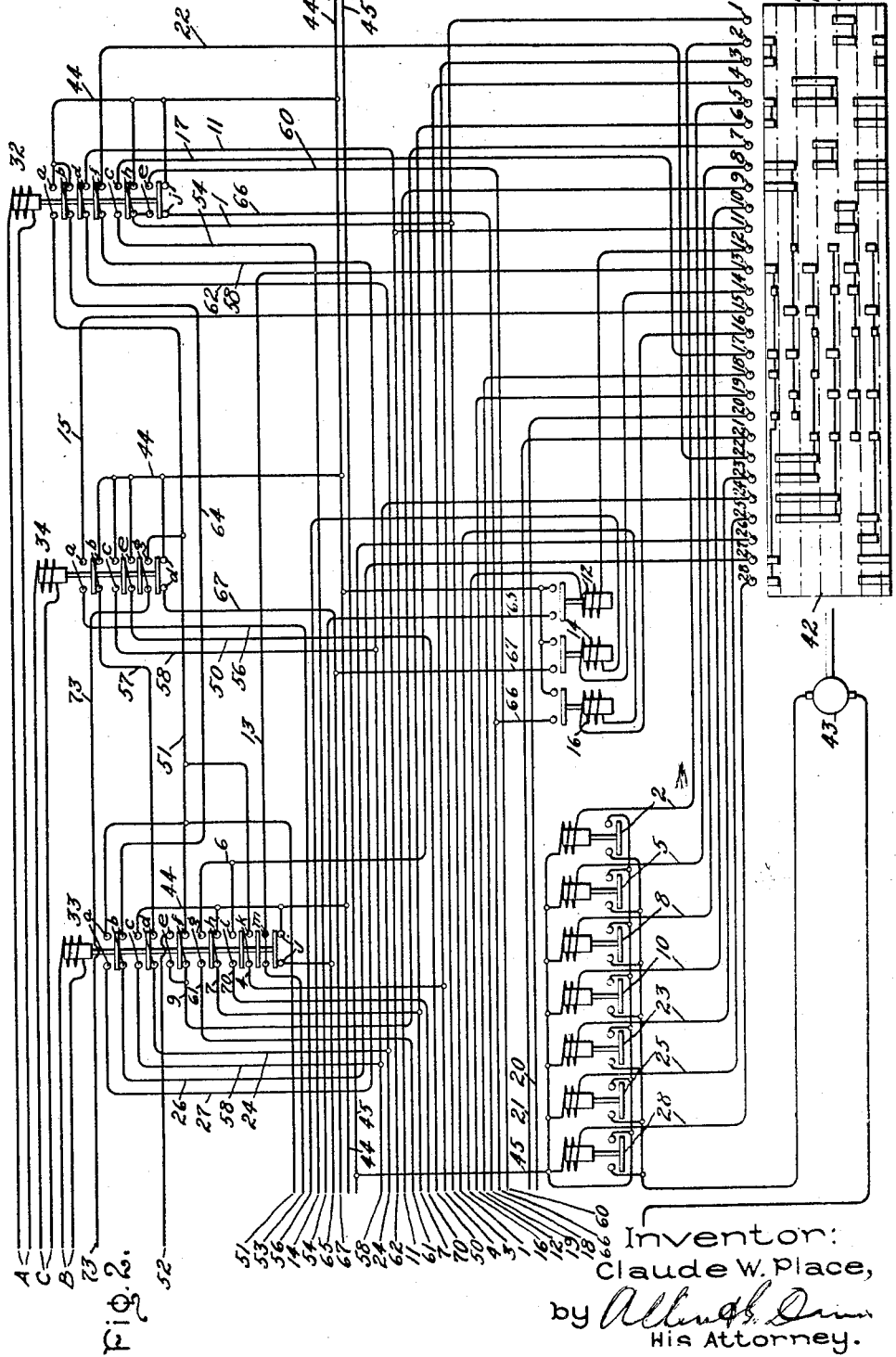

Patented Oct. 18, 1927.

1,646,215

UNITED STATES PATENT OFFICE.

CLAUDE W. PLACE, OF LA GRANGE, ILLINOIS, ASSIGNOR TO GENERAL ELECTRIC COMPANY, A CORPORATION OF NEW YORK.

AUTOMATIC SWITCHING EQUIPMENT.

Application filed September 15, 1922. Serial No. 588,469.

My invention relates to automatic switching equipments and particularly to automatic switching equipments which are arranged to control the connection between a plurality of sources of current and a distribution system.

In electric systems in which a plurality of sources of power are arranged to be connected to a distribution system, it is sometimes desirable that certain sources supply current to the distribution system whenever they are energized, that other sources act as supplementary sources and supply current only in case the preferred sources fail or are overloaded, and that other sources serve as emergency sources, and supply current only in case one of the other sources fails.

One object of my invention is to provide a new and improved automatic switching equipment which is arranged to control the connections between a plurality of sources of current and a distribution system in such manner that the sources are arranged to be connected and disconnected from the distribution system in accordance with the condition of the respective sources.

Another object of my invention is to provide an automatic switching equipment which is arranged to control the connections between a plurality of sources of current and a distribution system so that one of the sources is connected to the distribution system whenever it is energized so that another of said sources is connected to the distribution system whenever it is energized and said one of said sources is either deenergized or overloaded, and so that a third of said sources is connected to the distribution system whenever it is energized and both of said first and second mentioned sources are deenergized or either of said sources is deenergized and the other one is overloaded.

A further object of my invention is to provide an automatic switching equipment which is arranged to control the connection between a plurality of sources of current and a distribution system so that under certain load conditions on the distribution system one of the sources supplies current to all of the load connected to the distribution system and under other load conditions said one source supplies current only to a portion of the load and another source supplies current to another portion of the load.

My invention will be better understood from the following description taken in connection with the accompanying drawings and its scope will be pointed out in the appended claims.

In the accompanying drawing, Figs. 1 and 2 show diagrammatically an electric system embodying my invention, and Fig. 3 shows a modification of a portion of the system shown in Figs. 1 and 2.

Referring to Figs. 1 and 2 of the accompanying drawings, A, B and C each represents a source of current, such as an alternating current supply circuit, which is arranged to be connected to a distribution system which may comprise a plurality of distribution circuits such as the two feeders D and E. In order to simplify the drawing, single phase alternating current sources are shown but it is to be understood that my invention is not limited to any particular number of phases and that it is applicable to direct current systems as well as to alternating current systems.

As shown in the drawing the source A is arranged to be connected directly to the feeder D by a circuit breaker F and the source B is arranged to be connected directly to the feeder E by a circuit breaker G. The feeders D and E are arranged to be connected together by circuit breakers H and J and the source C is arranged to be connected to the feeder D by the circuit breakers K and J and to the feeder E by the circuit breakers K and H. The circuit breakers may be of any suitable type. For the purpose of this description, it will be assumed that the circuit breakers are of the well known latched-in type which are held in their closed positions by a latch not shown. Each breaker is therefore provided with a closing coil 30, which, when energized, closes the breaker, a trip coil 31 which, when energized, releases the latch which holds the circuit breaker closed, auxiliary contacts, $a$, $a'$ etc. which are closed when the breaker is closed and auxiliary contacts $b$, $b'$ etc. which are closed when the breaker is open.

The circuits of the coils 30 and 31 of the circuit breakers, F, G, H, J and K are opened and closed in response to different conditions of the sources A, B and C and the feeders D and E so that under different conditions said sources are connected to said feeders in different combinations. The source A is the preferred source, and is arranged to be connected to the feeder D by the circuit breaker F whenever source A is energized. When the load conditions on both feeders are such that one source can supply all the load, the source A is also arranged to be connected to the feeder E by the circuit breakers H and J. In case the load conditions are such that one source cannot supply the total load then the source A is arranged to supply only the feeder D and the supplementary source B, if energized, is arranged to be connected to the feeder E by the circuit breaker G. If the supplementary source B is not energized, the emergency source C, if energized, is arranged to be connected to the feeder E instead. If the supplementary source B and the emergency source C are both not energized the preferred source A remains connected to both feeders.

If the load conditions are such that one source can supply the total load and the preferred source A is not energized, the supplementary source B is arranged to be connected to both feeders by the circuit breakers G, H and J. If, however, both of the sources A and B are not energized, the emergency source C is arranged to be connected to both feeders by the circuit breakers K, H and J.

If the load conditions are such that one source cannot supply the total load and the source A is not energized, the supplementary source B is connected to the feeder E by the circuit breaker G and the emergency source C is connected to the feeder D by the circuit breakers K and J. If, however, the preferred source A and the supplementary source C are both not energized, the supplementary source B is connected to both feeders by the circuit breakers G, H and J. If, however, the preferred source A and the supplementary source B are not energized, the emergency source C is connected to both feeders by the circuit breakers K, H and J.

The above connections are arranged to be established in response to either the energization or deenergization of one or more of the sources.

For controlling the circuits of the closing coils 30 and the trip coils 31 of the circuit breakers F, G, H, J and K so that the proper coils are energized in the proper sequence when a change is being made in the connections between the sources A, B and C and the feeders D and E, a controller 42 is provided. This controller comprises stationary contacts and movable segments which are arranged to interconnect the stationary contacts in the proper sequence as the controller moves from one position to another. Any other suitable means however may be used for controlling the sequence in which the coils are energized and deenergized. The controller 42 may be driven by any suitable means such as an electric motor 43 which may be connected to any suitable source such as a control circuit 44, 45.

The fixed contacts of the controller 42 are numbered 1 to 28, inclusive and in order to make it easy to trace the circuits through these contacts, the conductors permanently connected to these contacts and the relays energized thereby are designated by the same numbers as the respective contacts. For example, the control relay 23 is energized by the conductor 23 which in turn is connected to the stationary contacts 23 of the controller 42.

As shown in the drawing the controller 42 is arranged to stop in six different positions designated by the Roman numerals I to VI inclusive. The horizontal broken lines indicate the positions of the stationary contacts on the segments of the controller in the different stopping positions.

The controller stops in position I if the circuit breakers F and G are closed, the sources A and B are energized, and the load connected to the distribution system exceeds a predetermined value. The controller stops in position II if the circuit breakers F, K and H are closed, the sources A and C are energized and the source B is deenergized, and the load connected to the distribution system exceeds a predetermined value. The controller stops in position III if the circuit breakers G, K and J are closed, the circuit breaker F is open, the sources B and C are energized, the source A is deenergized and the load connected to the distribution system exceeds a predetermined value. The controller stops in position IV if the circuit breakers F, H and J are closed, the source A is energized, and the load on the source A does not exceed a predetermined value while either of the sources B and C are energized. The controller stops in position V when the circuit breakers G, H and J are closed, the source B is energized, the source A is deenergized and the load on the source B does not exceed a predetermined amount while the source C is energized. The controller stops in position VI if all the sources are deenergized and also if only the source C is energized and the circuit breakers K, H and J are closed.

The segments on the controller are so arranged that the movement of the controller from one stopping position to another and the proper connections between the sources and the feeders are effected in accordance with predetermined conditions of the sources and of the distribution system. The particular conditions for controlling the operation of the controller and of the circuit breakers in the arrangement shown in the drawing are the voltages of the sources and the load on the system. In order to control the operation in response to the voltages of the sources in the system shown in Figs. 1 and 2, the sources A, B and C are provided with the voltage relays 32, 33 and 34, respectively. In order to control the operation in response to the load on the system shown in Figs. 1 and 2 the sources A and C are provided with the underload relays 35 and 37 and the sources A and B are provided with the overload relays 39 and 40, respectively.

The voltage relays 32, 33 and 34 are arranged to close their contacts $a$, $c$, $e$, etc. (alternate letters of the alphabet) when the voltages of the respective sources exceed predetermined values and to close their auxiliary contacts $b$, $d$, $f$, etc. when the voltages of the respective sources are below predetermined values. The underload relay 35 is arranged to close its contact $b$ and the underload relay 37 is arranged to close its contacts $b$, $b'$ when the currents supplied by the respective sources A and C are less than predetermined values. The overload relays 39 and 40 are arranged to close their contacts $a$ when the currents supplied by the respective circuits exceed predetermined values.

The circuits of the control relays 2, 5, 8, 10, 12, 14, 16, 23, 25 and 28 are controlled by the contacts of the controller, and the contacts of the voltage, underload and overload relays, and the auxiliary contacts on the circuit breakers in a manner hereinafter described. Each of the control relays 2, 5, 8, 10, 23, 25 and 28, when energized, completes the circuit of the driving motor 43 of the controller across the control circuit 44, 45. The control relays 12, 14 and 16, when energized, complete the circuits of the trip coils 31 of the circuit breakers G, K and F, respectively, across the control circuit 44—45. The circuits of the trip coils 31 of the circuit breakers G, K and F are also arranged to be completed by contacts of the voltage relays 33, 34 and 32 respectively. When the source A is deenergized the current of the trip coil 31 of the circuit breaker F is completed, if the circuit breaker is closed, by means of the auxiliary contacts $a'$ on the circuit breaker, conductor 66 and contacts $j$ of the voltage relay 32. When the source B is deenergized the circuit of the trip coil 31 of the circuit breaker G is completed, if the circuit breaker is closed, by means of the auxiliary contacts $a''$ on the circuit breaker G, conductor 65, and contacts $j$ of the voltage relay 33. When the source C is deenergized the circuit of the trip coil 31 of the circuit breaker K is completed, if the circuit breaker is closed, by means of the auxiliary contacts $a$ on the circuit breaker K, conductor 67 and contacts $d$ of the voltage relay 34.

The operation of the system shown will be described by assuming that the controller is in position VI, and then describing how the controller is moved from this position in response to different conditions of the sources, how different conditions of the sources cause the controller to stop in its different stopping positions, and how the movement of the controller from one position to another effects the opening and closing of the circuit breakers in the proper sequence.

In position VI of the controller the segments on the controller connect together the contacts 2 and 3, the contacts 5 and 6, the contacts 8 and 9 and the contacts 27 and 28. As heretofore described, the contacts 2, 5, 8 and 28 are connected to the control bus 45 by means of the conductors 2, 5, 8 and 28, respectively which have connected in series therewith the operating coils of the control relays 2, 5, 8 and 28, respectively.

The conductor 3, which is connected to the contact 3 of the controller, is arranged to be connected to the control conductor 44 by means of the auxiliary contact $b'$ on the circuit breaker K, the conductor 50 and the contacts $e$ of the voltage relay 34 which is connected across the emergency source C. Therefore the circuit through the conductors 2 and 3 is completed in position VI of the controller when the source C is energized and the circuit breaker K is open so that the control relay 2 is energized. As heretofore described the energization of the control relay 2 connects the motor 43 across the supply circuit 44, 45. The segments on the controller are arranged to connect together the contacts 2 and 3 while the controller is in position VI and until it reaches position I. Therefore the energization of the control relay 2 under the above conditions effects the movement of the controller from position VI to position I.

The conductor 6, which is connected to the contact 6 of the controller, has two branches, one of which is arranged to be connected to the control conductor 44 by means of the contacts $g$ of the voltage relay 33 connected across the source B, conductor 61, and the auxiliary contacts $b'$ on the circuit breaker G, and the other of which is arranged to be connected to the control conductor 44 by means of the contacts $i$ of the voltage relay 33, conductor 70, contacts $a$ of the overload relay 40 associated with the source B, conductor 50 and the contacts $e$ of the voltage relay 34. The circuit through the control relay 5 is therefore completed in position VI of the controller when the source B is energized and either the circuit breaker G is open or the source C is energized and the source B is overloaded. The segments on the controller are arranged to connect together the contacts 5 and 6 while the controller is in positions V and VI and until it reaches position I. Therefore the energization of the control relay 5 under the above conditions effects the movement of the controller from position VI to position I.

The conductor 9, which is connected to the contact 9 of the controller, has two branches. One of these branches is arranged to be connected to the control conductor 44 by means of the contact $e$ of the voltage relay 33, conductor 52, either the auxiliary contacts $b$ on the circuit breaker F or the auxiliary contacts $b$ on the circuit breaker G which are connected in multiple, conductor 51 and contacts $a$ of the voltage relay 32. The other branch of the conductor 9 is arranged to be connected to the control conductor 44 by means of the contacts $f$ of the voltage relay 33, conductor 51 and contacts $a$ of the voltage relay 32. It is therefore evident that the circuit through the control relay 8 is completed in position VI of the controller either when both of the sources A and B are energized and either one of the circuit breakers F, G is open or when the source A is energized and the source B is de-energized. The segments on the controller are arranged to connect together the contacts 8 and 9 while the controller is in positions V, VI and I and until it reaches position II. Therefore the energization of the control relay under the above conditions effects the movement of the controller from position VI to position II.

The conductor 27, which is connected to the contact 27 of the controller, is arranged to be connected to the control conductor 44 by means of the contacts $a$ of the voltage relay 33, conductor 51 and the contacts $a$ of the voltage relay 32. The circuit through the control relay 28 is therefore completed in position VI of the controller when both of the sources A and B are energized. The segments on the controller are arranged to connect together the contacts 27 and 28 while the controller is in positions V and VI and until it reaches position I. Therefore the energization of the control relay 28 under the above conditions effects the movement of the controller from position VI to position I.

From the above description it is evident that if either or both of the sources A and B are energized or the source C is energized and the circuit breaker K is open when the controller is in position VI, the controller moves from this position to one of its other positions. If, however, all of the sources are not energized or the source C is energized and the circuit breaker K is closed the controller remains in position VI.

As the controller moves from position VI to position I the segments on the controller connect the contacts 13, 17, 18, 20 and 14 to the contact 27 in the order named. If both of the sources A and B are energized so that the heretofore described circuit between the contacts 27 and the control conductor 44 through the contacts $a$ of the voltage relay 33, conductor 51 and contacts $a$ of the voltage relay 32 is completed the connecting of the contacts 13, 17, 18, 20 and 14 to the contact 27 effects the closing of the circuit breakers F and G and the opening of the other circuit breakers H, J and K in a manner hereinafter described if these circuit breakers are not already in these respective positions.

The contact 13 is arranged to be connected to the control conductor 45 by means of the conductor 13, contacts $m$ of the voltage relay 33, conductor 53, auxiliary contacts $b''$ on the circuit breaker G, and closing coil 30 of the circuit breaker G. Therefore, if the sources A and B are energized and the circuit breaker G is open, the closing coil 30 of the circuit breaker G is energized to close the circuit breaker when the controller moves from position VI to position I. The closing of the circuit breaker G connects the supplementary source B to the feeder E.

The contact 17 is arranged to be connected to the control conductor 45 by means of the conductor 17, contacts $c$ of the voltage relay 32, conductor 54, auxiliary contacts $b'$ on the circuit breaker F and the closing coil 30 of the circuit breaker F. Therefore, if the sources A and B are energized and the circuit breaker F is open when the controller moves from position VI to position I the closing coil 30 of the circuit breaker F is energized to close the circuit breaker. The closing of the circuit breaker F connects the preferred source A to the feeder D.

The contact 18 is arranged to be connected to the control conductor 45 by means of the conductor 18, trip coil 31 of the circuit breaker H and the auxiliary contacts $a'$ on the circuit breaker H. Therefore, if the sources A and B are energized and the circuit breaker H is closed when the controller moves from position VI to position I the trip coil 31 of the circuit breaker H is energized to effect the opening of this circuit breaker. The opening of the circuit breaker H disconnects the two feeders D and E from each other so that only the preferred source A supplies current to the feeder D and only the supplementary source B supplies current to the feeder E.

The contact 20 is arranged to be connected to the control conductor 45 by means of conductor 20, trip coil 31 of the circuit breaker J and the auxiliary contacts $a$ on the circuit breaker J. Therefore, if the sources A and B are energized and the circuit breaker J is closed when the controller moves from position VI to position I, the trip coil 31 of the circuit breaker J is energized to effect the opening of the circuit breaker.

The contact 14 is arranged to be connected to the control conductor 45 by means of the conductor 14, control relay 14, and the auxiliary contacts $a'$ on the circuit breaker K. Therefore, if the sources A and B are energized and the circuit breaker K is closed when the controller moves from position VI to position I, the control relay 14 is energized. The energization of the control relay 14 connects the trip coil 31 of the circuit breaker K across the control circuit 44, 45, through contacts $a$ on the circuit breaker K and conductor 67 so that the circuit breaker K opens.

From the above description, it is evident that if the sources A and B are energized when the controller moves from position VI to position I the circuits through the closing coils 30 of the circuit breakers G and F are completed if these circuit breakers are open and the circuits through the trip coils 31 of the circuit breakers H, J and K are completed if these circuit breakers are closed. The energization of the closing coils 30 of the circuit breakers G and F effects the closing of these circuit breakers so that the sources A and B are connected to the feeders D and E, respectively, and the energization of the trip coils 31 of the circuit breakers H, J and K effects the opening of these circuit breakers so that the feeders D and E are disconnected from each other and from the source C. If, however, either one of the sources A and B is deenergized the movement of the controller from position VI to position I does not effect the opening or closing of any of the circuit breakers.

As shown in the drawing, the segments on the controller 42 are so arranged that the circuits through the closing coils 30 of the circuit breakers F and G are completed before the circuits through the trip coils 31 of the circuit breakers H, J and K are completed. Therefore, there is no interruption in the supply of current to the feeders D and E in case they are being supplied with current when the controller moves from position VI and the sources A and B are energized. For example, if the source C is supplying current to the feeders D and E through the circuit breakers K, H and J when the controller leaves position VI the sources B and A are first connected in parallel with the source C and then the feeders are disconnected from each other and from the source C without any interruption in the supply of current to either feeder. Such an arrangement, however, can only be used where the sources A, B and C are exactly in phase and have the same voltage, as is the case where they are supplied from a common source. Where the sources cannot be connected in parallel, first it is necessary to disconnect the feeders from the sources from which they are to be disconnected and then to connect them to the proper sources. With such an arrangement there would be an interruption in the supply of current to a feeder when the change from one source to another is taking place. Such a sequence of operation however could be obtained, if desired, with the arrangement shown in the drawing by merely changing the relative lengths of the segments on the controller so that the contacts 14, 20 and 18 are connected to the contact 27 before the contacts 13 and 17 are connected thereto.

In position I of the controller the segments on the controller connect the contacts 8 and 9 together so that, if the source A is energized and the source B is deenergized, the heretofore described circuit between contact 9 and the control conductor 44 through contacts $f$ of the voltage relay 33, conductor 51 and contacts $a$ of the voltage relay 32 is completed; and if both of the sources A and B are energized and either one of the circuit breakers F, G is open, the heretofore described circuit between the contact 9 and the control conductor 44 through contacts $e$ of the voltage relay 33, conductor 52, contacts $b$ of either the circuit breaker F or the circuit breaker G or both, conductor 51 and contacts $a$ of the control relay 32 is completed. Therefore, if the source A is energized and either the source B is deenergized or the source B is energized, and either one of the circuit breakers F, G is open when the controller is in position I, the control relay 8 is energized to complete the circuit of the driving motor 43 to effect the movement of the controller from position I to position II.

In position I the segments on the controller also connect together the contacts 22 and 23 and the contacts 24 and 25.

As heretofore described the contacts 23 and 25 of the controller are connected to the control bus 45 by means of the conductors 23 and 25, respectively, which have connected in series therewith the control relays 23 and 25.

The conductor 22, which is connected to the contact 22, is arranged to be connected to the control conductor 44 by means of contacts $f$ of the voltage relay 32, conductor 58 and either the contacts $c$ of the voltage relay 33 or the contacts $c$ of the voltage relay 34. Therefore, when the controller is in position I, the circuit through the control relay 23 is completed when the source A is deenergized and either one of the other sources is energized. The segments on the controller are arranged to connect the contacts 22 and 23 together while the controller is in position II and III and until it reaches position III. Therefore, the energization of the control relay under the above conditions effects the movement of the controller from position I to position III.

The conductor 24, which is connected to the contact 24, has two branches. One of these branches is arranged to be connected to the control conductor 44 by means of the contacts $d$ of the voltage relay 33, conductor 57 and contacts $b$ of the voltage relay 34. The other branch is arranged to be connected to the control conductor 44 by means of the auxiliary contacts $a$ on the circuit breaker F, conductor 55 and contacts $b$ of the underload relay 35 associated with the preferred source A. Therefore, the circuit through the conductors 24 and 25 is arranged to be completed in position I of the controller either when both of the sources B and C are deenergized or when the circuit breaker F is closed and the amount of current supplied by the source A is less than a predetermined amount which is determined by the setting of the underload relay 35.

From the above description, it is evident that the controller remains in position I only when the circuit breakers F and G are closed, the sources A and B are energized and the current supplied by the source A exceeds a predetermined value.

As the controller moves from position I to position II the segments on the controller connect the contacts 15, 17, 19, 20 and 12 to the contact 9 in the order named.

If the source A is energized and either the source B is deenergized or the source B is energized and either one of the circuit breakers F, G is open, so that the contact 9 is connected to the control conductor 44 in the manner heretofore described, the connecting of the contacts 15, 17, 19, 20 and 12 to the contact 9 effects the closing of circuit breakers F and H, the closing of the circuit breaker K if the source C is energized, and the opening of the circuit breakers G and J in a manner hereinafter described if these circuit breakers are not already in these respective positions.

The contact 15 is arranged to be connected to the control conductor 45 by means of the conductor 15, contacts $a$ of the voltage relay 34, conductor 56, auxiliary contacts $b''$ on the circuit breaker K and closing coil 30 of the circuit breaker K. Therefore if the contact 9 is connected to the control conductor 44, the source C is energized and the circuit breaker K is open when the controller moves from position I to position II, the closing coil 30 of the circuit breaker K is energized to close this circuit breaker when the controller moves from position I to position II.

Since, as heretofore described, the contact 17 is arranged to be connected to the control conductor 45 by means of the conductor 17, contacts $c$ of the voltage relay 32, conductor 54, auxiliary contacts $b'$ on the circuit breaker F and the closing coil 30 of the circuit breaker F, it is evident that if the contact 9 is connected to the control conductor 44, the source C is energized and the circuit breaker F is open when the controller moves from position I to position II, the closing coil 30 of the circuit breaker F is energized to close this circuit breaker.

The contact 19 is arranged to be connected to the control conductor 45 by means of the conductor 19, closing coil 30 of the circuit breaker H and auxiliary contacts $b'$ on the circuit breaker H. Therefore, if the contact 9 is connected to the control conductor 44 and the circuit breaker H is open when the controller moves from position I to position II, the closing coil 30 of the circuit breaker H is energized to effect the closing of this circuit breaker.

Since, as heretofore described, the contact 20 is arranged to be connected to the control conductor 45 by means of the conductor 20, trip coil 31 of the circuit breaker J and the auxiliary contacts $a$ on the circuit breaker J, it is evident that if the contact 9 is connected to the control conductor 44 and the circuit breaker J is closed when the controller moves from position I to position II, the trip coil 31 of the circuit breaker J is energized to effect the opening of this circuit breaker.

The contact 12 is arranged to be connected to the control conductor 45 by means of the conductor 12, control relay 12 and auxiliary contacts $a'$ on the circuit breaker G. Therefore, if the contact 9 is connected to the control conductor 44 and the circuit breaker G is closed when the controller moves from position I to position II, the control relay 12 is energized. The energization of the control relay 12 connects the trip coil 31 of the circuit breaker G across the control circuit 44, 45, through contacts $a''$ on the circuit breaker G and conductor 65, so that the circuit breaker G opens.

From the above description, it is evident that if the source A is energized and either the source B is deenergized or the source B is energized and either one of the circuit breakers F, G is open when the controller moves from position I to position II, the circuits through the closing coils 30 of the circuit breakers F and H are completed, if these circuit breakers are open, the circuit through the closing coil 30 of the circuit breaker K is completed if this circuit breaker is open and the source C is energized and the circuits through the trip coils 31 of the circuit breakers G and J are completed if these circuit breakers are closed. The energization of the closing coils 30 of the circuit breakers K, H and F effects the closing of these circuit breakers, and the energization of the trip coils 31 of the circuit breakers G and J effects the opening of these circuit breakers, so that the preferred source A is connected to the feeder D, and if the emergency source C is energized it is connected to the feeder E.

If, however, the contact 9 is not connected to the control conductor 44, the movement of the controller from position I to position II does not effect the opening or closing of any of the circuit breakers.

As shown in the drawing the segments on the controller are so arranged that the circuits through the closing coils 30 of the circuit breakers K, H and F are completed before the circuits through the trip coils 31 of the circuit breakers G and J are completed. Therefore, there is no interruption in the supply of current to the feeders D and E in case they are being supplied with current when the controller moves from position I. In case it is necessary first to disconnect the feeders from the sources from which they are to be disconnected and then to connect them to the proper sources, this operation may be obtained with the arrangement shown in the drawing by merely changing the relative lengths of the segments on the controller so that the contacts 12 and 20 are connected to the contact 9 before the contacts 15, 17 and 19 are connected thereto.

In position II of the controller the segments on the controller connect together the contacts 22 and 23, so that if the source A is deenergized and either one of the other sources is energized the heretofore described circuit between the contact 22 and the control conductor 44 is completed. Therefore, the control relay 23 is energized and effects the movement of the controller from position II to position III.

In position II the segments on the controller also connect together the contacts 24 and 25. Therefore, the heretofore described circuit through the control relay 25 is completed in position II of the controller either when both of the sources B and C are deenergized or when the circuit breaker F is closed and the amount of current supplied by the source A is less than a predetermined amount which is determined by the setting of the underload relay 35. The energization of the control relay 25 under the above conditions effects the movement of the controller from position II to position IV.

In position II the segments on the controller also connect together contacts 4 and 5. As heretofore described the contact 5 is connected to the control conductor 45 by means of the conductor 5 which has connected in series therewith the control relay 5. The conductor 4 which is connected to the contact 4 has two branches. One of these branches is arranged to be connected to the control conductor 44 by means of the contacts $k$ of the voltage relay 33, conductor 51 and contacts $a$ of the voltage relay 32. The other branch is arranged to be connected to the control conductor 44 by means of the auxiliary contacts $b$ on the circuit breaker K, conductor 73, contacts $g$ of the voltage relay 34, conductor 51 and contacts $a$ of the voltage relay 32. Therefore, the circuit through the control relay 5 is arranged to be completed in position II of the controller when the source A is energized and either the source B is energized or the source C is energized and the circuit breaker K is open. The segments on the controller are arranged to maintain the contacts 4 and 5 connected together while the controller is in positions II and III and until it reaches position IV. Therefore, the energization of the control relay 5 under the above conditions effects the movement of the controller from position I to position IV.

From the above description it is evident that the controller remains in position II only if the circuit breakers F and K are closed, the source B is deenergized, the sources A and C are energized and the current supplied by the source A exceeds a predetermined value.

As the controller moves from position II to position III, the segments on the controller connect the contacts 13, 15, 21, 18 and 16 to the contact 22 in the order named. If the source A is deenergized and either one of the other sources is energized so that the contact 22 is connected to the control conductor 44 in the manner heretofore described, the connecting of the contacts 13, 15, 21, 18 and 16 to the contact 22 effects the closing of the circuit breaker J, the closing of the circuit breaker G if the source B is energized, the closing of the circuit breaker K if the source C is energized, and the opening of the circuit breakers F and H in the manner hereinafter described, if these circuit breakers are not already in these respective positions.

Since the contact 13 is arranged to be connected to the control conductor 45 by means of the conductor 13, contacts $m$ of the voltage relay 33, conductor 53, contacts $b''$ on the circuit breaker G and the closing coil 30 of the circuit breaker G, it is evident that if the contact 9 is connected to the control conductor 44, the source B is energized, and the circuit breaker G is open, when the controller moves from position II to position III, the closing coil 30 of the circuit breaker G is energized to close the circuit breaker.

From the above description it is also evident that if the contact 22 is connected to the control conductor 44, the source C is energized and the circuit breaker K is open when the controller moves from position II to position III, the closing coil 30 of the circuit breaker K is energized to effect the closing of this circuit breaker when the segments on the controller connect the contact 15 to the contact 22.

The contact 21 is arranged to be connected to the control conductor 45 by means of the conductor 21, closing coil 30 of the circuit breaker J and auxiliary contacts $b'$ on the circuit breaker J. Therefore, if the conductor 22 is connected to the control conductor 44 and the circuit breaker J is open when the controller moves from position II to position III, the closing coil 30 of the circuit breaker J is energized to close this breaker.

Since the contact 18 is arranged to be connected to the control conductor 45 by means of the conductor 18, trip coil 31 of the circuit breaker H and the auxiliary contacts $a'$ on the circuit breaker H, it is evident that if the conductor 22 is connected to the control conductor 44 and the circuit breaker H is closed when the controller moves from position II to position III, the trip coil 31 of the circuit breaker H is energized to open this circuit breaker.

The contact 16 is arranged to be connected to the control conductor 45 by means of the conductor 16, control relay 16, and auxiliary contacts $a''$ on the circuit breaker F. Therefore, if the contact 22 is connected to the control conductor 44 and the circuit breaker F is closed when the controller moves from position II to position III, the control relay 16 is energized. The energization of the control relay 16 connects the trip coil 31 of the circuit breaker F across the control circuit 44, 45, through auxiliary contacts $a'$ on the circuit breaker F and conductor 66, so that the circuit breaker F is opened.

From the above description it is evident that if the source A is deenergized and either one of the other sources is energized when the controller moves from position II to position III, the circuits through the closing coils 30 of the circuit breakers G, K and J are completed if these circuit breakers are open and the sources B and C are energized, and the circuits through the trip coils 31 of the circuit breakers F and H are completed if these circuit breakers are closed. The energization of the closing coils 30 of the circuit breakers G, K and J effects the closing of these circuit breakers and the energization of the trip coils 31 of the circuit breakers F and H effects the opening of these circuit breakers, so that the supplementary source B if it is energized is connected to the feeder E and the emergency source C if it is energized is connected to the feeder D.

If, however, the contact 22 is not connected to the control conductor 44, the movement of the controller from position II to position III does not effect the opening and closing of any of the circuit breakers.

As shown in the drawing, the segments on the controller are so arranged that the circuits through the closing coils 30 of the circuit breakers G, K and J are completed before the circuits through the trip coils 31 of the circuit breakers H and F are completed. Therefore, there is no interruption in the supply of current to the feeders D and E in case they are being supplied with current when the controller moves from position II. If, however, it is necessary first to disconnect the feeders from the sources from which they are to be disconnected and then to connect them to the proper sources, this operation may be obtained with the arrangement shown in the drawing by merely changing the relative lengths of the segments on the controller so that the contacts 16 and 18 are connected to the contact 22 before the contacts 13, 15 and 21 are connected thereto.

In position III of the controller, the segments on the controller connect together the contacts 24 and 25 so that the heretofore described circuit through the control relay 25 is energized if both of the sources B and C are deenergized or the circuit breaker F is closed and the amount of current supplied by the source A is less than a predetermined amount which is determined by the setting of the underload relay 35. The energization of the control relay 25 under the above conditions effects the movement of the controller from position III to position IV.

In position III the segments on the controller also connect together the contacts 4 and 5 so that if the source A is energized and either the source B is energized or the source C is energized and the circuit breaker K is open, the heretofore described circuit for the control relay 5 is completed. The energization of the control relay 5 under the above conditions effects the movement of the controller from position III to position IV.

In position III the segments on the controller also connect together the contacts 7 and 8. As heretofore described, the contact 8 is connected to the control conductor 45 by means of the conductor 8 which has connected in series therewith the control relay 8. The conductor 7 which is connected to the contact 7 has two branches, one of which is arranged to be connected to the control conductor 44 by the contacts $b$ of the underload relay 37 and the other of which is arranged to be connected to the control conductor 44 by the contacts $h$ of the voltage relay 33. Therefore, the circuit through the control relay 8 is arranged to be completed in position III of the controller either when the source B is deenergized or when the load connected to the source C is below a predetermined value determined by the setting of the underload relay 37.

From the above description it is evident that the controller remains in position III only if the source A is deenergized, the sources B and C are both energized and the current supplied by the source C exceeds a predetermined value.

As the controller moves from position III to position IV, the segments on the controller connect the contacts 17, 19, 21, 12 and 14 to the contact 24 in the order named.

If the sources B and C are deenergized or the source A is energized and the current supplied thereby is less than a predetermined value, so that the contact 24 is connected to the control conductor 44 in the manner heretofore described, the connecting of the contacts 17, 19, 21, 12 and 14 to the contact 24 effects the closing of the circuit breakers H and J, the closing of the circuit breaker F if the source A is energized, and the opening of the circuit breakers G and K, in a manner hereinafter described, if these circuit breakers are not already in these respective positions.

Since the circuit between the contact 17 and the control conductor 45 is completed when the contacts $c$ of the voltage relay 32 and the auxiliary contacts $b'$ on the circuit breaker F are closed, it is evident that if the contact 24 is connected to the control conductor 44, the source A is energized, and the circuit breaker F is open when the controller moves from position III to position IV, the closing coil 30 of the circuit breaker F is energized to close this circuit breaker.

Since the circuit between the contact 19 and the control conductor 45 is completed when the auxiliary contacts $b'$ on the circuit breaker H are closed, it is evident that if the contact 24 is connected to the control conductor 44 and the circuit breaker H is open when the controller moves from position III to position IV, the closing coil 30 of the circuit breaker H is energized to close this circuit breaker.

Since the circuit between the contact 21 and the control conductor 45 is completed when the auxiliary contacts $b'$ on the circuit breaker J are closed, it is evident that if the contact 24 is connected to the control conductor 44 and the circuit breaker J is open when the controller moves from position III to position IV, the closing coil 30 of the circuit breaker J is energized to close this circuit breaker.

Since the circuit between the contact 12 and the control conductor 45 is completed when the auxiliary contacts $a'$ on circuit breaker G are closed, it is evident that if the contact 24 is connected to the control conductor 44 and the circuit breaker G is closed when the controller moves from position III to position IV, the control relay 12 is energized and effects the opening of the circuit breaker G in the manner heretofore described.

Since the contact 14 is connected to the control conductor 45 when the auxiliary contacts $a'$ on the circuit breaker K are closed, it is evident that if the contact 24 is connected to the control conductor 44 and the circuit breaker K is closed when the controller moves from position III to position IV, the control relay 14 is energized and effects the opening of the circuit breaker K in the manner heretofore described.

From the above description, it is evident that if both of the sources B and C are deenergized, or the circuit breaker F is closed, the amount of current supplied by the source A is less than a predetermined value, when the controller moves from position III to position IV, the circuits of the closing coils 30 of the circuit breakers H and J are completed if these circuit breakers are open; the circuit of the closing coil 30 of the circuit breaker F is completed if this circuit breaker is open and the source A is energized, and the circuits of the trip coils 31 of the circuit breakers G and K are completed if these circuit breakers are closed. The energization of the closing coils 30 of the circuit breakers F, H and J effects the closing of these circuit breakers and the energization of the trip coils 31 of the circuit breakers G and K effects the opening of these circuit breakers so that the feeders D and E are connected together and the source A supplies current to both of these feeders if it is energized.

If, however, the contact 24 is not connected to the control conductor 44 when the controller moves from position III to position IV, the movement of the controller from position III to position IV does not effect the opening and closing of any of the circuit breakers.

As shown in the drawing, the segments on the controller are so arranged that when the controller moves from position III to position IV the circuits through the closing coils 30 of the circuit breakers F, H and J are completed before the circuits through the trip coils 31 of the circuit breakers G and K are completed. Therefore, there is no interruption in the supply of current to the feeders D and E in case they are being supplied with current when the controller moves from position III to position IV. If, however, it is necessary first to disconnect the feeders from the sources from which they are to be disconnected, and then to connect them to the proper sources this operation may be obtained with the arrangement shown in the drawing by merely changing the relative lengths of the segments on the controller so that the contacts 14 and 12 are connected to the contact 24 before the contacts 17, 19 and 21 are connected thereto.

In position IV of the controller, the segments on the controller connect together the contacts 10 and 11 and the contacts 1 and 2.

As heretofore described the contacts 2 and 10 are connected to the control conductor 45 by the conductors 2 and 10, respectively, which have connected in series therewith the control relays 2 and 10.

The conductor 11 which is connected to the contact 11 has two branches. One of these branches is arranged to be connected to the control conductor 44 by means of the contacts $d$ of the voltage relay 32, conductor 62, and the auxiliary contacts $a$ on the circuit breaker H. The other branch of the conductor 11 is arranged to be connected to the control conductor 44 by means of the auxiliary contacts $a$ on the circuit breaker G, conductor 63 and the contacts $b'$ of the underload relay 37. Therefore, the control relay 10 is arranged to be energized in position IV of the controller either when the source A is deenergized and the circuit breaker H is closed or when the circuit breaker G is closed and the amount of current supplied by the source C is such that the contacts $b'$ of the underload relay 31 are closed. The segments on the controller are arranged to connect together the contacts 10 and 11 while the controller is in position IV and until it reaches position V. Therefore, the energization of the control relay 10 under the above conditions effects the movement of the controller from position IV to position V.

The conductor 1, which is connected to the contact 1, has three branches. One of these branches is arranged to be connected to the control conductor 44 by the contacts $h$ of the voltage relay 32. Another one of these branches is arranged to be connected to the control conductor 44 by means of the contacts $e$ of the voltage relay 32, conductor 60 and either the auxiliary contacts $b$ on the circuit breaker H or the auxiliary contacts $b$ on the circuit breaker J, or the auxiliary contacts $b''$ on the circuit breaker F. The third branch is arranged to be connected to the control conductor 44 by means of the contacts $a$ of the overload relay 39 associated with the source A, conductor 58, and either the contacts C of the voltage relay 33 or the contacts $c$ of the voltage relay 34. Therefore, the control relay 2 is arranged to be energized in position IV of the controller either when the source A is deenergized or when the source A is energized and any one of the circuit breakers H, J, F is open, or when the source A is energized, and the amount of current supplied thereby is such that the overload relay 39 closes its contacts $a$ and either the source B or the source C is energized. The segments on the controller are arranged to connect together the contacts 1 and 2 in position IV and until it reaches position V. Therefore, the energization of the control relay 2 under the above conditions effects the movement of the controller from position IV to position V.

From the above description, it is evident that the controller remains in position IV if the source A is energized and the circuit breakers F, H and J are closed and the amount of current supplied by the source A is such that the contacts $a$ of the overload relay 39 are not closed.

As the controller moves from position IV to position V the segments on the controller connect the contacts 13, 19, 21, 14 and 16 to the contact 11 in the order named. If the contact 11 is connected to the control conductor 44 in the manner above described, the connecting of the contacts 13, 19, 21, 14 and 16 effects the closing of the circuit breakers H and J, the closing of the circuit breaker G if the source B is energized, and the opening of the circuit breakers K and F in a manner hereinafter described, if these circuit breakers are not already in these respective positions.

Since the contact 13 is arranged to be connected to the control conductor 45 when the contacts $m$ of the voltage relay 33 and the auxiliary contacts $b''$ on the circuit breaker G are closed, it is evident that if the source B is energized and the circuit breaker G is open and the contact 11 is connected to the control conductor 44 in the manner above described, when the controller moves from position IV to position V, the closing coil 30 of the circuit breaker G is energized to close this circuit breaker.

Since the contact 19 is arranged to be connected to the control conductor 45 when the auxiliary contacts $b'$ on the circuit breaker H are closed, it is evident that if the circuit breaker H is open and the contact 11 is connected to the control conductor 44 when the controller moves from position IV to position V, the closing coil 30 of the circuit breaker H is energized to close this breaker. Since the contact 21 is arranged to be connected to the control conductor 45 when the contacts $b'$ on the circuit breaker J are closed, it is evident that if the circuit breaker J is open and the contact 11 is connected to the control conductor 44, when the controller moves from position IV to position V, the closing coil 30 of the circuit breaker J is energized to close this circuit breaker.

Since the contact 14 is arranged to be connected to the control conductor 45 when the contacts $a'$ on the circuit breaker K are closed, it is evident that if the contact 11 is connected to the control conductor 44 and the circuit breaker K is closed, when the controller moves from position IV to position V, the control relay 14 is energized to effect the opening of the circuit breaker K in the manner above described.

Since the contact 16 is arranged to be connected to the control conductor 45, when the contacts a'' on the circuit breaker F are closed, it is evident that if the circuit breaker F is closed and the contact 11 is connected to the control conductor 44, when the circuit breaker moves from position IV to position V, the control relay 16 is energized to effect the opening of the circuit breaker F in the manner above described.

From the above description, it is evident that if the source A is deenergized and the circuit breaker H is closed, or the circuit breaker G is closed, and the contacts b' of the underload relay 37 are closed, when the controller moves from position IV to position V, the circuits through the closing coils 30 of the circuit breakers H and J are completed, if these circuit breakers are open, the circuit through the closing coil 30 of the circuit breaker G is completed, if this circuit breaker is open and the source B is energized, and the circuits through the trip coils 31 of the circuit breakers F and K are completed, if these circuit breakers are closed.

If, however, the contact 11 is not connected to the control conductor 44 the movement of the controller from position IV to position V does not effect the opening and closing of any of the circuit breakers.

As shown in the drawing, the segments on the controller are so arranged that the circuits through the closing coils 30 of the circuit breakers G, H and J are completed before the circuits through the trip coils 31 of the circuit breakers F and K are completed. Therefore, there is no interruption in the supply of current to the feeders D and E in case they are being supplied with current when the controller moves from position IV. If, however, it is necessary first to disconnect the feeders from the sources from which they are to be disconnected and then to connect them to the proper sources this operation may be obtained with the arrangement shown in the drawing by merely changing the relative lengths of the segments on the controller so that the contacts 16 and 14 are connected to the contact 11 before the contacts 13, 19 and 21 are connected thereto.

In position V of the controller the segments on the controller connect together the contacts 8 and 9 so that the heretofore described circuit through the control relay 8 is energized if the source A is energized and either the source B is deenergized or the source B is energized and either the circuit breaker F or the circuit breaker G is open. The energization of the control relay 8 under the above conditions effects the movement of the controller from position V to position II.

In position V the segments on the controller also connects together the contacts 5 and 6 so that if the source B is energized and either the circuit breaker G is open or the amount of current supplied by the source B is such that the contacts a of the overload relay 40 are closed and the source C is energized, the control relay 5 is energized and effects the movement of the controller from position V to position I.

In position V the segments on the controller also connect together the contacts 27 and 28 so that if both of the sources A and B are energized the heretofore described circuit through the control relay 28 is completed. The energization of the control relay under the above conditions effects the movement of the controller from position V to position I.

In position V the segments on the controller also connect together the contacts 25 and 26.

As heretofore described the contact 25 is connected to the control conductor 45 by means of the conductor 25 which has connected in series therewith the control relay 25. The contact 26 is arranged to be connected to the control conductor 44 by means of the contacts b of the voltage relay 33, conductor 64 and contacts b of the voltage relay 32. Therefore, the circuit through the contacts 25 and 26 is arranged to be completed in position V of the controller when both of the sources B and C are deenergized.

From the above description, it is evident that the controller remains in position V if the source A is deenergized and the source B is energized and the amount of current supplied by the source B does not exceed a predetermined value.

As the controller moves from position V to position VI the segments on the controller connect the contacts 15, 19, 21, 12 and 16 to the contact 26 in the order named. If both of the sources A and B are deenergized so that the contact 26 is connected to the control conductor 44 the connecting of the contacts 15, 19, 21, 12 and 16 to the contact 26 effects the closing of the circuit breakers H and J if these circuit breakers are open, the closing of the circuit breaker K if this circuit breaker is open and the source C is energized, and the opening of the circuit breakers F and G if these circuit breakers are closed.

Since the circuit between the contact 15 and the control conductor 45 is completed when the contacts a of the voltage relay 34 and the contacts b'' on the circuit breaker K are closed, it is evident that if the contact 26 is connected to the control conductor 44 and the source C is energized and the circuit breaker F is open when the controller moves from position V to position VI the closing coil of the circuit breaker K is energized and closes this circuit breaker.

Since the circuit between the contact 19 and the control conductor 45 is completed when the contacts b' on the circuit breaker H are closed, it is evident that if the contact 26 is connected to the control conductor 44 and the circuit breaker H is open when the controller moves from position V to position VI the closing coil 30 of the circuit breaker H is energized and closes the circuit breaker.

Since the circuit through the contact 21 and the control conductor 45 is completed when the contacts b' on the circuit breaker K are closed, it is evident that if the contact 26 is connected to the control conductor 44 and the circuit breaker J is open when the controller moves from position V to position VI, the closing coil 30 of the circuit breaker J is energized and closes this circuit breaker.

Since the circuit between the contact 12 and the control conductor 45 is completed when the contacts a' on the circuit breaker G are closed, it is evident that if the contact 26 is connected to the control conductor 44 and the circuit breaker G is closed when the controller moves from position V to position VI the control relay 12 is energized to effect the opening of the circuit breaker G in the manner heretofore described.

Since the contact 16 is connected to the control conductor 45 when the contacts a'' on the circuit breaker F are closed it is evident that if the contact 26 is connected to the control conductor 44 and the circuit breaker F is open when the controller moves from position V to position VI the control relay 16 is energized and effects the opening of the circuit breaker F in the manner above described.

From the above description it is evident that if both of the sources A and B are deenergized when the controller moves from position V to position VI the circuit breakers H and J are closed so that the feeders D and E are connected together the circuit breakers F and G are opened so that the sources A and B are disconnected from the feeders and the circuit breaker K is closed if the source C is energized.

If, however, the contact 26 is not connected to the control conductor 44, the movement of the controller from position V to position VI does not effect the opening and closing of any of the circuit breakers. As shown in the drawing, the segments on the controller are so arranged that the circuits through the closing coils 30 of the circuit breakers K, H and J are completed before the circuits through the trip coils 31 of the circuit breakers F and G are completed. Therefore there is no interruption in the supply of current to the feeders in case they are being supplied with current when the controller is in position V. If however, it is necessary first to disconnect the feeders from the sources from which they are to be disconnected, this operation may be obtained with the arrangement shown in the drawing by changing the relative lengths of the segments on the controller so that the contacts 12 and 16 are connected to the contact 26 before the contacts 15, 19 and 21 are connected thereto.

As heretofore described, the controller remains in position VI when all of the sources are deenergized, and when only the source C is energized, the circuit breaker K is closed. The controller is arranged to be moved out of position VI in a manner heretofore described when either the source A or the source B is energized or the source C is energized and the circuit breaker K is open.

From the above description, it is apparent that the position in which the controller 42 stops, depends entirely upon the conditions of the sources and of the distribution system, and that as soon as the conditions change so that the sources should be connected to the distribution system in a different combination, the controller automatically moves to the position corresponding to the new conditions, and in so doing automatically connects and disconnects the proper sources to and from the distribution system.

The arrangement shown in Fig. 1, which comprises the underload relays 35 and 37 for indicating when the load connected to the distribution system is such when two sources are supplying the distribution system that one source can supply all the current without being overloaded, is satisfactory where the ratio of the loads connected to the two feeders D and E is substantially constant, as is the case where the two feeders supply the same character of load. Under these conditions the current supplied by either source indicates approximately what the total load on the system is, so that the arrangement shown in Fig. 1 is entirely satisfactory. When, however, the ratio of the loads on the two feeders is subject to wide variation, the arrangement shown in Fig. 1 is not satisfactory, because under certain conditions the underload relay associated with one of the sources might indicate that the load conditions were such that one source could supply all of the current, whereas the load on the other source might be such that the total load would be much more than one source could safely carry. Therefore, the controller would operate continuously, first to connect both feeders to one source and then to connect each feeder to a separate source. This cycle of operation would continue until the load conditions changed.

In order to prevent this continuous operation of the controller under the above conditions, a single relay which is connected so as to operate in response to the total current supplied to the distribution system may be used instead of the underload relays 35 and 37. Such an arrangement is shown in Fig. 3 in which the contacts 35$^b$ and the contacts 37$^b$ and 37$^{b'}$ which are the same as the contacts controlled by the relays 35 and 37 respectively, are controlled by a relay 80 which is connected in the well known manner to series transformers in the supply circuits A, B and C, so that the current through the coil of the relay 80 is proportional to the total current supplied at any instant to the distribution system. With such an arrangement, the contacts 35$^b$, 37$^b$, and 37$^{b'}$ are closed only when the total load connected to the distribution system is less than a predetermined value.

While I have shown and described one embodiment of my invention, I do not desire to be limited thereto, but seek to cover in the appended claims all those modifications that fall within the true spirit and scope of my invention.

What I claim as new and desire to secure by Letters Patent of the United States, is:

1. In combination, a plurality of sources of current, a distribution system comprising a plurality of circuits, switching means arranged to connect said sources and said circuits together, means operative to effect the operation of said switching means to establish the connection of all of said circuits to one of said sources, and means operative in response to an electrical condition of said system to effect the operation of said switching means to establish the connection of one of said circuits to a second source and the disconnection of said one of said circuits from said first source.

2. In combination, a plurality of sources of current, a distribution system comprising a plurality of circuits, switching means arranged to connect said sources and said circuits together, and means for effecting the operation of said switching means to establish the connection of said one of said sources to all of said circuits of said system when said one of said sources is energized and the load connected to said system does not exceed a predetermined value and the disconnection of some of said circuits from said one of said sources and the connection of said disconnected circuits to another one of said sources when the load connected to said system exceeds a predetermined value, said last mentioned means comprising means operated in response to the voltages of said sources, and means responsive to the load on said distribution system.

3. In combination, a source of current, a second source of current, a distribution system comprising two distribution circuits, switching means arranged to connect said sources to said distribution system and said circuits together, means operative in response to the voltage of said first mentioned source to effect the operation of said switching means to establish the connection of said first source to one of said circuits and the connection of said circuits together, and means operative in response to the load connected to said system when said first source is connected thereto to effect the operation of said switching means to establish the connection of said second source to the other one of said circuits and the disconnection of said circuits from each other.

4. In combination, a source of current, a second source of current, a distribution system comprising two distribution circuits, switching means arranged to connect said sources to said distribution system and said circuits together, means operative in response to the voltages of said sources to effect the operation of said switching means to establish the connection of said first mentioned source to one of said circuits and the connection of said circuits together when said first mentioned source is energized and the connection of said second source to the other of said circuits and the connection of said circuits together when said first source is not energized and said second source is energized, and means operative in response to the load connected to said system when said first source is connected thereto to effect the operation of said switching means to establish the connection of said second source to said other circuit and the disconnection of said circuits from each other.

5. In combination, a source of current, a second source of current, a third source of current, a distribution system comprising two distribution circuits, switching means arranged to connect said sources to said distribution system and said circuits together, means operative to effect the operation of said switching means to establish the connection of said first mentioned source to one of said circuits and the connection of said circuits together, means operative to effect the operation of said switching means to establish the connection of said second source to the other of said circuits and the connection of said circuits together, and means operative in response to the voltages of said sources and the load connected to said system when said first source is connected thereto to effect the operation of said switching means to establish the connection of said third source to said other one of said circuits and the disconnection of said circuits from each other when the load exceeds a predetermined value and said second source is not energized.

6. In combination, a source of current, a second source of current, a third source of current, a distribution system comprising two distribution circuits, switching means arranged to connect said sources to said distribution system and said circuits together, means operative to effect the operation of said switching means to establish the connection of said first mentioned source to one of said circuits and the connection of said circuits together, means operative to effect the operation of said switching means to establish the connection of said second source to the other one of said circuits and the connection of said circuits together, and means operative in response to the voltages of said sources and the load connected to said system when said second source is connected thereto to effect the operation of said switching means to establish the connection of said third source to said one of said circuits and the disconnection of said circuits from each other when the load exceeds a predetermined value and said first mentioned source is not energized.

7. In combination, a source of current, a second source of current, a third source of current, a distribution system comprising two distribution circuits, switching means arranged to connect said sources to said distribution system and said circuits together, means operative in response to the voltage of said first mentioned source to effect the operation of said switching means to establish the connection of said first source to one of said circuits and the connection of said circuits together, means operative in response to the load connected to said system when said first source is connected thereto to effect the operation of said switching means to establish the connection of said second source to the other one of said circuits and the disconnection of said circuits from each other, means operative in response to the voltages of said sources and the load connected to said system when said first mentioned source is connected to said system to effect the operation of said switching means to establish the connection of said third source to said other one of said circuits and the disconnection of said circuits from each other when the load exceeds a predetermined value and said second source is not energized, and means operative in response to the voltages of said sources and the load connected to said system when said second source is connected to said system to effect the operation of said switching means to establish the connection of said third source to said one of said circuits and the disconnection of said circuits from each other when the load exceeds a predetermined value and said first source is not energized.

8. In combination, a source of current, a second source of current, a distribution system, switching means arranged to connect said sources to said system, and means arranged to effect the operation of said switching means to establish the connection of said first source to said system whenever it is energized, the connection of said second source to said system whenever said second source is energized and either said first source is not energized or said first source is energized and connected to said system and the load connected to the system exceeds a predetermined value, the disconnection of each one of said sources from said system whenever it is connected to the system and fails, and the disconnection of said second source from said system whenever said second source is connected to said system said first source is energized and the load on said system is less than a predetermined amount, said last mentioned means comprising means responsive to the respective voltages of said sources, and means responsive to the load connected to said system.

9. In combination, a source of current, a second source of current, a third source of current, a distribution system, switching means arranged to connect said sources to said system, and means arranged to effect the operation of said switching means to establish the connection of said first source to said system whenever it is energized, the connection of said second source to said system whenever said second source is energized and either said first source is not energized or said first source is energized and connected to said system and the load connected to the system exceeds a predetermined value, the connection of said third source to said system whenever said first and third sources are energized, said second source is not energized and the load connected to said system exceeds a predetermined value, the disconnection of each one of said sources from said system when it is connected thereto and fails, the disconnection of said second source from said system whenever said second source is connected thereto said first source is energized and the load connected to said system is less than a predetermined value, and the disconnection of said third source from said system whenever said third source is connected thereto either one of the other two sources is energized and the load connected to said system is less than a predetermined value, said last mentioned means comprising means responsive to the respective voltages of said sources and means responsive to the load connected to said system.

10. In combination, a source of current, a second source of current, a third source of current, a distribution system, switching means arranged to connect said sources to said system, and means arranged to effect the operation of said switching means to establish the connection of said first source to said system whenever it is energized, the connection of said second source to said system whenever said second source is energized and either said first source is not energized or said first source is energized and connected to said system and the load connected to the system exceeds a predetermined value, the connection of said third source to said system whenever said second and third sources are energized said first source is not energized and the load connected to said system exceeds a predetermined value, the disconnection of each one of said sources from said system when it is connected thereto and fails, the disconnection of said second source from said system whenever said second source is connected thereto said first source is energized and the load connected to said system is less than a predetermined value, and the disconnection of said third source from said system whenever said third source is connected thereto either one of the other two sources is energized and the load connected to said system is less than a predetermined value, said last mentioned means comprising means responsive to the respective voltages of said sources and means responsive to the load connected to said system.

11. In combination, a source of current, a second source of current, a third source of current, a distribution system, switching means arranged to connect said sources to said system, and means arranged to effect the operation of said switching means to establish the connection of said first source to said system whenever it is energized, the connection of said second source to said system whenever said second source is energized and either said first source is not energized or said first source is energized and connected to said system and the load connected to the system exceeds a predetermined value, the connection of said third source to said system whenever said first and third sources are energized, said second source is not energized and the load connected to said system exceeds a predetermined value, the disconnection of each one of said sources from said system when it is connected thereto and fails, the disconnection of said second source from said system whenever said second source is connected thereto said first source is energized and the load connected to said system is less than a predetermined value, and the disconnection of said third source from said system whenever it is connected to said system and both of the other two sources are energized, said last mentioned means comprising means responsive to the respective voltages of said sources and means responsive to the load connected to said system.

12. In combination, a source of current, a second source of current, a third source of current, a distribution system, switching means arranged to connect said sources to said system, and means arranged to effect the operation of said switching means to establish the connection of said first source to said system whenever it is energized, the connection of said second source to said system whenever said second source is energized and either said first source is not energized or said first source is energized and connected to said system and the load connected to the system exceeds a predetermined value, the connection of said third source to said system whenever said second and third sources are energized said first source is not energized and the load connected to said system exceeds a predetermined value, the disconnection of each one of said sources from said system when it is connected thereto and fails, the disconnection of said second source from said system whenever said second source is connected thereto said first source is energized and the load connected to said system is less than a predetermined value, and the disconnection of said third source from said system whenever it is connected thereto and both of the other two sources are energized, said last mentioned means comprising means responsive to the respective voltages of said sources and means responsive to the load connected to said system.

13. In combination, a source of current, a second source of current, a distribution system comprising two distribution circuits, switching means arranged to connect said sources to said distribution system and said circuits together, means arranged to effect the operation of said switching means to establish the connection of said first source to one of said circuits, the connection of said circuits together and the disconnection of said second source from said system whenever said first source is energized and the load connected to said system is less than a predetermined value; the connection of said second source to the other one of said circuits, the connection of said circuits together and the disconnection of said first source from said one of said circuits whenever said first source is not energized, said second source is energized and the load connected to said system is less than a predetermined value, and the connection of said first source to said one of said circuits, the connection of said second source to said other one of said circuits and the disconnection of said circuits from each other whenever said first and second sources are energized and the load connected to said system exceeds a predetermined value, said last mentioned means comprising means responsive to the respective voltages of said sources, and means responsive to the load connected to said system.

14. In combination, a source of current, a second source of current, a third source of current, a distribution system comprising two circuits, switching means arranged to connect said sources to said distribution system and said circuits together, means arranged to effect the operation of said switching means to establish the connection of said first mentioned source to one of said circuits, the connection of said circuits together and the disconnection of said second source from said system whenever said first source is energized and the load connected to said system is less than a predetermined value; the connection of said second source to the other one of said circuits, the connection of said circuits together and the disconnection of said first source from said one of said circuits whenever said first source is not energized, said second source is energized and the load connected to said system is less than a predetermined value; the connection of said first source to said one of said circuits, the connection of said second source to said other one of said circuits and the disconnection of said circuits from each other whenever said first and second sources are energized and the load connected to said system exceeds a predetermined value, and the connection of said third source to both of said circuits and the disconnection of said first and second sources from said system when said first and second sources are not energized and said third source is energized, said last mentioned means comprising means responsive to the respective voltages of said sources and means responsive to the load connected to said system.

15. In combination, a source of current, a second source of current, a third source of current, a distribution system comprising two circuits, switching means arranged to connect said sources to said distribution system and said circuits together, means arranged to effect the operation of said switching means to establish the connection of said first source to one of said circuits, the connection of said circuits together and the disconnection of said second source from said system whenever said first source is energized and the load connected to said system is less than a predetermined value; the connection of said second source to the other one of said circuits, the connection of said circuits together and the disconnection of said first source from said one of said circuits whenever said first source is not energized, said second source is energized and the load connected to said system is less than a predetermined value, the connection of said first source to said one of said circuits, the connection of said second source to said other one of said circuits and the disconnection of said circuits from each other whenever said first and second sources are energized and the load connected to said system exceeds a predetermined value, and the connection of said third source to said one of said circuits, the connection of said second source to said other one of said circuits, the disconnection of said circuits from each other, and the disconnection of said first source from said system whenever said first source is not energized, said second and third sources are energized and the load connected to said system exceeds a predetermined value, said last mentioned means comprising means responsive to the respective voltages of said sources, and means responsive to the load connected to said system.

16. In combination, a source of current, a second source of current, a third source of current, a distribution system, comprising two circuits, switching means arranged to connect said sources to said distribution system and said circuits together, means arranged to effect the operation of said switching means to establish the connection of said first source to one of said circuits, the connection of said circuits together and the disconnection of said second source from said system whenever said first source is energized and the load connected to said system is less than a predetermined value, the connection of said second source to the other one of said circuits, the connection of said circuits together and the disconnection of said first source from said one of said circuits whenever said first source is not energized, said second source is energized and the load connected to said system is less than a predetermined value, the connection of said first source to said one of said circuits, the connection of said second source to said other one of said circuits and the disconnection of said circuits from each other whenever said first and second sources are energized and the load connected to said system exceeds a predetermined value, and the connection of said third source to said other one of said circuits, the connection of said first source to said one of said circuits, the disconnection of said circuits from each other, and the disconnection of said second source from said system whenever said second source is not energized, said first and third sources are energized, and the load on said system exceeds a predetermined value, said last mentioned means comprising means responsive to the respective voltages of said sources, and means responsive to the load connected to said system.

17. In combination, a plurality of sources of current, a distribution system comprising two circuits, switching means arranged to connect said sources to said system and said circuits together, and means arranged to effect the operation of said switching means to establish the connection of one of said sources to one of said circuits, the connection of said circuits together and the disconnection of all of the other sources from said system whenever said one source is energized and either all of the other sources are not energized or the load connected to said system is less than a predetermined value, and the connection of a second one of said sources to the other one of said circuits and the connection of said circuits together whenever said second source is energized and either all of the other sources are not energized or said first source is not energized and the load connected to said system is less than a predetermined value, said last mentioned means comprising means responsive to the respective voltages of said sources, and means responsive to the load connected to said system.

18. In combination, a plurality of sources of current, a distribution system comprising two circuits, switching means arranged to connect said sources to said system and said circuits together, and means arranged to effect the operation of said switching means to establish the connection of one of said sources to one of said circuits, the connection of said circuits together and the disconnection of all of the other sources from said system whenever said one source is energized and either all of the other sources are not energized or the load connected to said system is less than a predetermined value, the connection of a second source to the other one of said circuits and the connection of said circuits together whenever said second source is energized and either all of the other sources are not energized or said one source is not energized and the load connected to said system is less than a predetermined value, the connection of a third source to said one of said circuits, the connection of said circuits together and the disconnection of said one and second sources from said system whenever said one and second sources are not energized and said third source is energized, the connection of said third source to said one of said circuits, the connection of said second source to said other one of said circuits, and the disconnection of said circuits from each other and of said one source from said system whenever said one source is not energized, said second and third sources are energized and the load on said system exceeds a predetermined value, and the connection of said third source to said other one of said circuits, the connection of said one source to said one of said circuits, and the disconnection of said circuits from each other and of said second source from said system whenever said one and third sources are energized, said second source is not energized and the load connected to said system exceeds a predetermined value, said last mentioned means comprising means responsive to the respective voltages of said sources and means responsive to the load connected to said system.

19. In combination, a source of current, a second source of current, a third source of current, a distribution system, switching means arranged to connect said sources to said system and means arranged to effect the operation of said switching means to establish the connection of said first mentioned source to said distribution system whenever said first source is energized, the connection of said second source to said distribution system whenever said first source is not energized and said second source is energized, and the connection of said third source to said distribution system whenever said third source is energized and the other two sources are not energized, said last mentioned means comprising means responsive to the respective voltages of said sources, and means for automatically controlling the sequence of operation of said switching means.

20. In combination, a source of current, a second source of current, a third source of current, a distribution system, switching means arranged to connect said sources to said system, and means arranged to effect the operation of said switching means to establish the connection of said first mentioned source to said distribution system when said first source is energized, the disconnection of said first source from said distribution system when said source fails, the connection of said second source to said distribution system when said first source is not energized and said second source is energized, the disconnection of said second source from said distribution system when said second source fails or said first source is energized, the connection of said third source to said distribution system when said first source fails said second source is not energized and said third source is energized, and the disconnection of said third source from said distribution system when either one of said other sources is energized or said third source fails, said last mentioned means comprising means responsive to the voltages of said sources, and means for automatically controlling the sequence of operation of said switching means.

21. In combination, a plurality of sources of current, a distribution system comprising a plurality of circuits, switching means arranged to connect said sources and said circuits together, and means arranged to effect the operation of said switching means to establish the connection of one of said sources to all of said circuits of said system when said one of said sources is energized and the load connected to said system does not exceed a predetermined value and to effect the disconnection of some of said circuits from said one of said sources and the connection of said disconnected circuits to another one of said sources when the load connected to said system exceeds a predetermined value, said last mentioned means comprising means responsive to the relative voltages of said sources, means responsive to the load connected to said distribution system, and means for automatically controlling the sequence of operation of said switching means.

22. In combination, a source of current, a second source of current, a distribution system comprising two distribution circuits, switching means arranged to connect said sources to said distribution system and said circuits together, means arranged to effect the operation of said switching means to establish the connection of said first source to one of said circuits, the connection of said circuits together and the disconnection of said second source from said system whenever said first source is energized and the load connected to said system is less than a predetermined value, the connection of said second source to the other one of said circuits, the connection of said circuits together and the disconnection of said first source from said one of said circuits whenever said first source is not energized, said second source is energized and the load connected to said system is less than a predetermined value, and the connection of said first source to said one of said circuits, the connection of said second source to said other one of said circuits and the disconnection of said circuits from each other whenever said first and second sources are energized and the load connected to said system exceeds a predetermined value, said last mentioned means comprising means responsive to the relative voltages of said sources, means responsive to the load connected to said distribution system, and means for automatically controlling the sequence of operation of said switching means.

23. In combination, a plurality of sources of current, a distribution system comprising two circuits, switching means arranged to connect said sources to said system and said circuits together, and means arranged to effect the operation of said switching means to establish the connection of one of said sources to one of said circuits, the connection of said circuits together and the disconnection of all of the other sources from said system whenever said one source is energized and either all of the other sources are not energized or the load connected to said system is less than a predetermined value, the connection of a second source to the other one of said circuits and the connection of said circuits together whenever said second source is energized and either all of the other sources are not energized or said one source is not energized and the load connected to said system is less than a pre-determined value, the connection of a third source to said one of said circuits, the connection of said circuits together and the disconnection of said one and second sources from said system whenever said one and second sources are not energized and said third source is energized, the connection of said third source to said one of said circuits, the connection of said second source to said other one of said circuits, and the disconnection of said circuits from each other and of said one source from said system whenever said one source is not energized, said second and third sources are energized and the load on said system exceeds a predetermined value, and the connection of said third source to said other one of said circuits, the connection of said one source to said one of said circuits, and the disconnection of said circuits from each other and of said second source from said system whenever said one and third sources are energized, said second source is not energized and the load connected to said system exceeds a predetermined value, said last mentioned means comprising means responsive to the relative voltages of said sources, means responsive to the load connected to said distribution system, and means for automatically controlling the sequence of operation of said switching means.

24. An electric system comprising a source of current, a second source of current, a third source of current, a distribution system, switching means arranged to connect each source to said distribution system, and means arranged to effect the connection of said first mentioned source to said distribution system whenever said first mentioned source is energized, the connection of said second source to said distribution system whenever said first source is not energized and said second source is energized and the connection of said third source to said distribution system whenever said third source is energized and the other two sources are not energized, said last mentioned means comprising means responsive to the respective voltages of said sources, and circuit controlling means arranged in cooperative relationship with each of said switching means and arranged to cooperate with said voltage responsive means to control said switching means.

25. An electric system comprising a source of current, a second source of current, a third source of current, a distribution system, switching means arranged to connect each source to said distribution system, means arranged to effect the connection of said first mentioned source to said distribution system when said first source is energized, the disconnection of said first source from said distribution system when said source fails, the connection of said second source to said distribution system when said first source is not energized and said second source is energized, the disconnection of said second source from said distribution system when said second source fails or said first source is energized, the connection of said third source to said distribution system when said first source fails said second source is not energized and said third source is energized, and the disconnection of said third source from said distribution system when either one of said other sources is energized, said last mentioned means comprising means responsive to the respective voltages of said sources, and circuit controlling means arranged in cooperative relationship with each of said switching means and arranged to cooperate with said voltage responsive means to control said switching means.

26. An electric system comprising a plurality of circuits, switching means arranged to connect said sources and said circuits together, and means arranged to effect the operation of said switching means to establish the connection of one of said sources to all of said circuits of said system when said one of said sources is energized and the load connected to said system does not exceed a predetermined value and to effect the disconnection of some of said circuits from said one of said sources and the connection of said disconnected circuits to another one of said sources when the load connected to said system exceeds a predetermined value, said last mentioned means comprising means responsive to the respective voltages of said sources, and circuit controlling means arranged in cooperative relationship with each of said switching means and arranged to cooperate with said voltage responsive means to control said switching means.

27. In a power-distribution system, the combination with two main supply lines and an auxiliary supply line, two main bus sections and an auxiliary bus section, of circuit interrupters for connecting the supply lines to the respective bus sections, connecting means between the auxiliary bus section and the two main bus sections, and means responsive to the demand on both main bus sections for connecting both sections to one supply line while the total demand is less than a predetermined value and for connecting each section to its corresponding supply line if such total demand exceeds such predetermined value.

28. In a power-distribution system, the combination with two main supply lines and an auxiliary supply line, two main bus sections and an auxiliary bus section, of circuit interrupters for connecting the supply lines to the respective bus sections, connecting means between the auxiliary bus sections and the two main bus sections, and means responsive to the demand on both main bus sections for connecting both sections to one supply line while the total demand is less than a predetermined value and for connecting each section to its corresponding supply line if such total demand exceeds such predetermined value, and for substituting the auxiliary supply line for either or both main supply lines if either or both main lines be faulty before the attempt to connect said line to its corresponding bus section or if either or both main lines become faulty during operation.

29. In a power-distribution system, the combination with two main supply lines and an auxiliary supply line, two main bus sections and an auxiliary bus section, of circuit interrupters for connecting the supply lines to the respective bus sections, means for connecting the auxiliary bus section to either main bus section, and means dependent upon an abnormal condition of either supply line for precluding the connection of that supply line to its corresponding bus section; for connecting such bus section to the auxiliary bus section; and for connecting the auxiliary supply line to the auxiliary bus section.

30. In a power-distribution system, the combination with two main supply lines and an auxiliary supply line, two main bus sections and an auxiliary bus section, of circuit interrupters for connecting the supply lines to the respective bus sections, connecting means between the auxiliary bus section and the two main bus sections, and means for selectively controlling the connecting means between the bus sections to permit one main supply line to provide energy for both main bus sections under predetermined load conditions and for controlling the connecting means and the circuit interrupters to permit one supply line to provide energy for each bus section under other predetermined load conditions, and means for substituting the auxiliary supply line for either main supply line if the electrical condition of said main supply line should be faulty or abnormal.

31. In a power-distribution system, the combination with a plurality of main supply lines and an auxiliary supply line, a plurality of main bus sections and an auxiliary bus section, of circuit interrupters for connecting the supply lines to the respective bus sections, connecting means between the auxiliary bus section and the main bus sections, and means for controlling the interrupters and the connecting means to permit energy to be supplied from only one line when the load is less than a predetermined value.

32. In a power-distribution system, the combination with two main supply lines and an auxiliary supply line, two main bus sections and an auxiliary bus section, of circuit interrupters for connecting the supply lines to the respective bus sections, connecting means between the auxiliary bus section and the main bus sections, and two load-responsive devices for selectively controlling the operation of all the connecting means.

33. In a power-distribution system, the combination with a plurality of sources of energy, a plurality of bus sections and connecting means between the sources of energy and the bus sections, and between adjoining bus sections, of means for summing the current supplied by the sources of energy to the bus sections and means responsive to such sum for controlling the connecting means.

34. In a power-distribution system, the combination with a plurality of main sources of energy and an auxiliary source of energy, a main bus section for each main source of energy and an auxiliary bus section for the auxiliary source of energy, of means for connecting the several sources of energy to the corresponding bus sections, means for connecting the auxiliary bus section to each of the main bus sections, a relay switch for each main source adapted to be actuated when such source becomes faulty or ineffective and means controlled by each relay switch for controlling the connection of the auxiliary source of energy to the corresponding bus section.

35. In combination, a plurality of main sources of current, an auxiliary source of current, a main load bus associated with each main source, an auxiliary load bus associated with said auxiliary source, circuit breakers between each source and its associated load bus and between said auxiliary bus and each main load bus, and means responsive to predetermined voltage conditions of said sources and load conditions of said busses for selectively controlling said circuit breakers.

36. In combination, a plurality of sources of current, a plurality of load circuits, and means responsive to predetermined voltage conditions of said sources and load conditions of said load circuit for effecting the connection of all of said load circuits to one of said sources when the total load connected to said load circuits is less than a predetermined value and the connection of each load circuit to a different one of said sources when the total load connected to said load circuits exceeds a predetermined value.

In witness whereof, I have hereunto set my hand this twelfth day of September, 1922.

CLAUDE W. PLACE.